United States Patent
Komiyama et al.

(10) Patent No.: US 7,833,923 B2
(45) Date of Patent: Nov. 16, 2010

(54) MONOLITHIC REFRACTORY MATERIAL HAVING LOW EXPANSIBILITY, HIGH STRENGTH, AND CRACK EXTENSION RESISTANCE

(75) Inventors: Tsuneo Komiyama, Toki (JP); Osamu Yamakawa, Kani (JP); Tetsuhiro Honjo, Mizunami (JP); Akito Higuchi, Kani (JP)

(73) Assignees: NGK Insulators, Ltd., Nagoya (JP); NGK Adrec Co., Ltd., Kani-Gun (JP)

( * ) Notice: Subject to any disclaimer, the term of this patent is extended or adjusted under 35 U.S.C. 154(b) by 282 days.

(21) Appl. No.: 12/035,082

(22) Filed: Feb. 21, 2008

(65) Prior Publication Data

US 2009/0149311 A1 Jun. 11, 2009

(30) Foreign Application Priority Data

Dec. 10, 2007 (JP) ............................... 2007-317900

(51) Int. Cl.
- *C04B 35/03* (2006.01)
- *C04B 35/04* (2006.01)
- *C04B 35/00* (2006.01)

(52) U.S. Cl. ...................... 501/119; 501/108; 501/112; 501/120; 501/122; 501/128

(58) Field of Classification Search ............... 501/108, 501/110, 112, 118, 119, 120, 122, 128, 153
See application file for complete search history.

(56) References Cited

U.S. PATENT DOCUMENTS

| | | | | |
|---|---|---|---|---|
| 4,125,407 A | * | 11/1978 | Ueno | 501/103 |
| 4,171,227 A | * | 10/1979 | Derolf et al. | 106/692 |
| 4,724,172 A | * | 2/1988 | Mosser et al. | 427/383.5 |
| 5,071,798 A | * | 12/1991 | Shibata et al. | 501/95.1 |
| 5,944,888 A | * | 8/1999 | Perich et al. | 106/600 |
| 2006/0121240 A1 | | 6/2006 | Hirai et al. | |
| 2006/0127422 A1 | * | 6/2006 | Lodyga et al. | 424/400 |

FOREIGN PATENT DOCUMENTS

| | | |
|---|---|---|
| JP | 03-075275 A1 | 3/1991 |
| JP | 06-293570 A1 | 10/1994 |
| JP | 2000-335980 A1 | 12/2000 |
| JP | 2004-231506 A1 | 8/2004 |
| JP | 2005-067945 A1 | 3/2005 |

* cited by examiner

*Primary Examiner*—Karl E Group
*Assistant Examiner*—Noah S Wiese
(74) *Attorney, Agent, or Firm*—Burr & Brown

(57) ABSTRACT

A monolithic refractory material is provided by a method including the steps of kneading cordierite powder having a median diameter in a range of 10 to 50 µm, and having a sharp mountain-like particle size distribution in which the content of particles smaller than 10 µm is 1% or more to 36% or less, the content of particles ranging from 10 µm or more to 50 µm or less is 50% or more to 75% or less, and the content of particles of 51 µm or more is 1% or more to 14% or less, and a solvent including water and alumina sol or silica sol solution.

5 Claims, 2 Drawing Sheets

MONOLITHIC REFRACTORY MATERIAL HAVING LOW EXPANSIBILITY, HIGH STRENGTH, AND CRACK EXTENSION RESISTANCE

BACKGROUND OF THE INVENTION

1. Field of the Invention

The present invention relates to a monolithic refractory material used in refractories and refractory ceramic products, and more particularly to a monolithic refractory material having low expansibility, high strength, and crack extension resistance used for the purpose of repairing, protecting, modifying, filling, and forming the surface, adhesive surface, interface, or joint of low-expansion fire bricks and refractory ceramic products.

2. Description of the Prior Art

Hitherto, a monolithic refractory material is used as an adhesive for refractories. Such monolithic refractory material is usually prepared by selecting an inorganic aggregate and a fine powder according to the purpose, and kneading in water, as disclosed in patent document 1 or patent document 2. However, since water is used as solvent, a sufficient strength may not be obtained, and though an aggregate of high melting point is used in order to improve the refractory property and corrosion resistance, a far-flung particle size distribution is obtained with the average particle size at the center, and as crack extension is great, strength is insufficient. Hence at the present there is no monolithic refractory material satisfying all of low expansibility, high strength, and crack extension resistance.

On the other hand, it has been also proposed to use the monolithic refractory material as repairing material, protective material, modifying material, or filler for repairing, protecting, modifying, and filling the surface of low-expansion ceramic product. Such mortar contains silicon carbide to adjust the thermal expansion, and maintains a low expansibility. However, since silicon carbide is non-oxide, and involves a problem of oxidation, and low expansibility cannot be maintained permanently, and the bond strength is lowered due to deterioration by oxidation. Further, since water is used as solvent, the adhesion strength is lowered. Accordingly, an oxide additive is used for improving the strength, but the thermal expansion is increased in this case.

Or, as shown in patent document 1, by mixing an aggregate of particle size of 2 mm or more and Portland cement, a mortar of superhigh toughness is proposed, but although the high strength is achieved, low expansibility and crack extension resistance cannot be improved.

As shown in patent document 3, a mixture of cordierite powder and water is proposed as coating material for modifying the surface of ceramic product, but although the low expansibility and high strength are achieved, crack extension resistance cannot be improved.

[Patent document 1] Japanese Patent Application Laid-Open (JP-A) No. 2005-67945
[Patent document 2] JP-A No. 1991-75275
[Patent document 3] JP-A No. 2004-231506

SUMMARY OF THE INVENTION

Problems to be Solved by the Invention

It is hence an object of the invention to solve the problems of the prior arts, and present a monolithic refractory material used for the purpose of protecting and modifying the surface of ceramic product of low expansibility, and more particularly a monolithic refractory material having low expansibility, high strength, and crack extension resistance capable of maintaining a favorable texture state while having low expansibility, high strength, and crack extension resistance.

Means for Solving the Problems

The mortar having low expansibility, high strength, and crack extension resistance of the invention devised for solving the problems described above is prepared by mixing cordierite powder, having a median diameter in a range of 10 to 50 µm, and a sharp mountain-like particle size distribution in which the content of particles smaller than 10 µm is 1% or more to 36% or less, the content of particles ranging from 10 µm or more to 50 µm or less is 50% or more to 75% or less, and the content of particles of 51 µm or more is 1% or more to 14% or less, and a solvent composed of water and silica sol solution.

The silica content or alumina content in alumina sol or silica sol solution is preferred to be in a range of 10 to 70% respectively. Further, the content of alkali oxide in alumina sol or silica sol solution is preferred to be 0.01% or more to 2% or less.

Effects of the Invention

The invention is realized by mixing cordierite powder, having a median diameter in a range of 10 to 50 µm, and a sharp mountain-like particle size distribution in which the content of particles smaller than 10 µm is 1% or more to 36% or less, the content of particles ranging from 10 µm or more to 50 µm or less is 50% or more to 75% or less, and the content of particles of 51 µm or more is 1% or more to 14% or less, and a solvent composed of water and alumina sol or silica sol solution, and therefore a low expansibility is assured by cordierite powder, and a high strength is expressed by using alumina sol or silica sol solution as solvent. Further, by using the cordierite powder having a sharp mountain-like particle size distribution, a high strength is expressed, and extension of cracks in monolithic refractory material may be prevented.

A higher strength is expressed by defining the alumina or silica content in alumina sol or silica sol solution in a range of 10 to 70%, and the content of alkali oxide in alumina sol or silica sol solution in a range of 0.01% or more to 2% or less.

DETAILED DESCRIPTION OF THE INVENTION

A preferred embodiment of the invention is specifically described below.

In the invention, a cordierite material is used in order to assure a low expansibility. The coefficient of thermal expansion of cordierite is low, about 1.6 to $2.0 \times 10^{-6}$/°C. at 900°C., and when applied on the surface of low-expansion ceramic product, the difference in expansion factor is small, and cracks may be prevented, and the cordierite itself is a material less likely to form cracks, and occurrence of cracks in monolithic refractory material may be prevented.

The cordierite powder has a median diameter in a range of 10 to 50 µm. The median diameter is the particle size where the powder amount of larger diameter and the powder amount of smaller diameter are equal with each other when the powder is divided into two parts by particle size, and it is expressed as D50. By managing the median diameter, a mortar favorable in processability, strength, and crack extension resistance may be obtained. If the median diameter is less than 10 μm, the additive amount of the solvent is excessive, and the strength may be lowered, or if more than 50 μm, the processability is favorable, but the strength is lowered.

Further, the cordierite powder has a sharp mountain-like particle size distribution in which the content of particles smaller than 10 μm is 1% or more to 36% or less, the content of particles ranging from 10 μm or more to 50 μm or less is 50% or more to 75% or less, and the content of particles of 51 μm or more is 1% or more to 14% or less. As a result of studies, the present inventor discovered that the adhesion strength and crack extension resistance can be enhanced by controlling the particle size distribution of cordierite powder.

Figure 1:
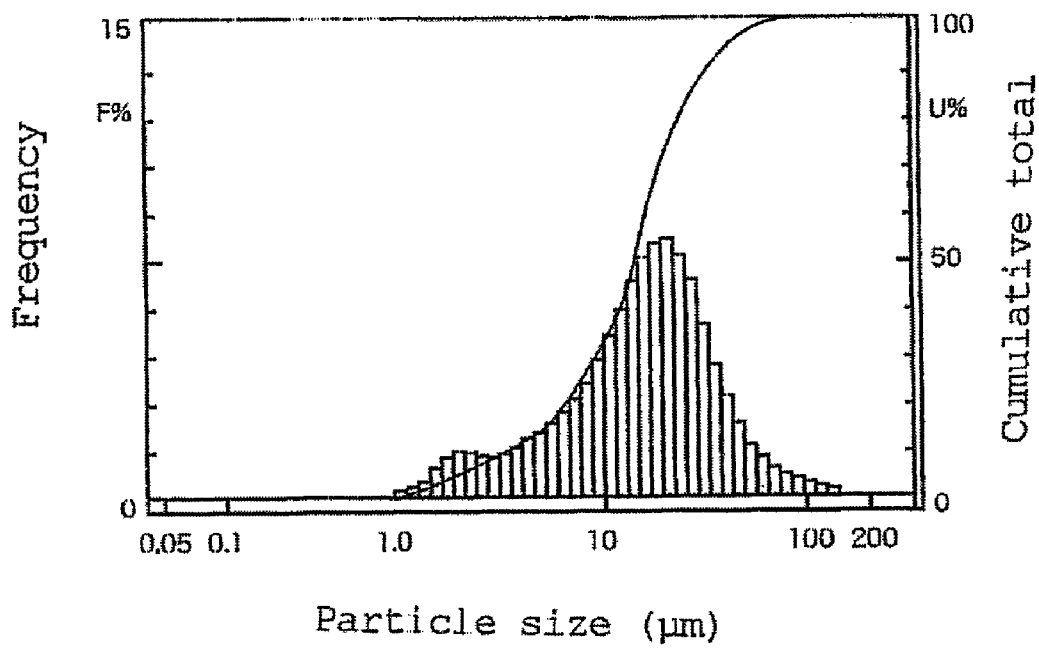
FIG. 1 is a particle size distribution graph of cordierite powder of the invention.
Figure 2:
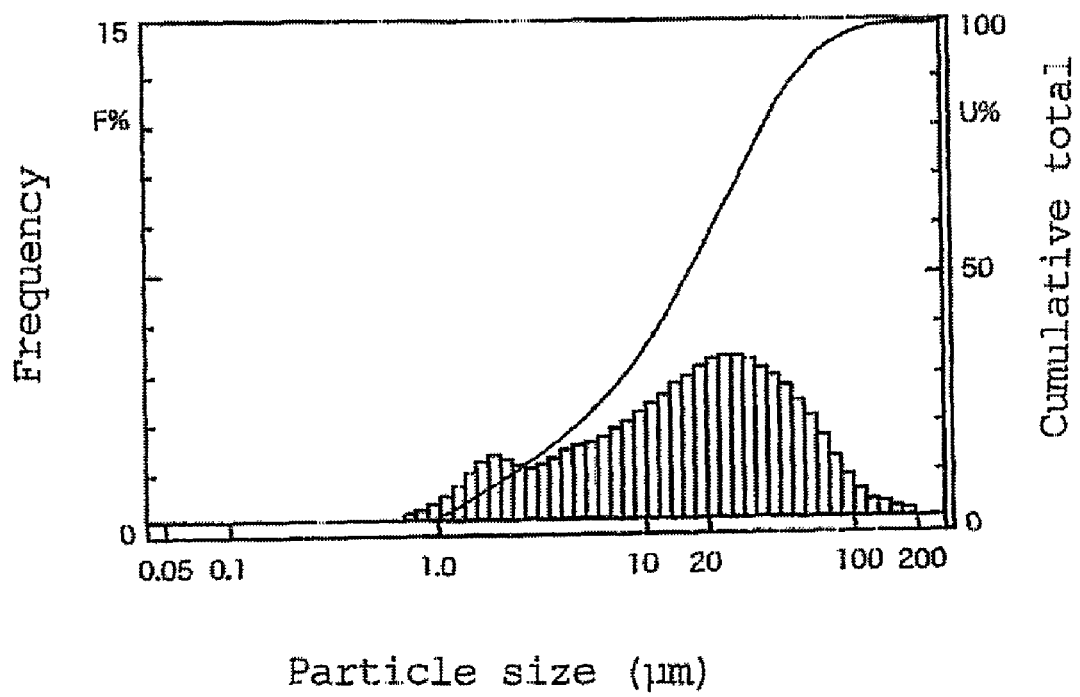
FIG. 2 is a particle size distribution graph of cordierite powder of the prior art.

FIG. 1 is a particle size distribution graph of cordierite powder of the invention, and FIG. 2 is a particle size distribution graph of cordierite powder of the prior art. The median diameter is 16.367±5 μm in FIG. 1, and the median diameter frequency is 7.5% or more, while in FIG. 2, on the other hand, the median diameter is 17.573 μm, and the median diameter frequency is 5.0% or less. According to the studies by the inventor, in a broad mountain-like particle size distribution having fluctuations in particle size as in the prior art, multiple pores are formed in the monolithic refractory material, and sufficient strength is not obtained, but in the invention in which particles are uniform in size, and a shape in mountain-like particle size distribution is obtained, the filling density is highest, and a sufficient strength is realized, and it is found that crack extension may be prevented.

The upper limit of median diameter frequency is preferred to be 11% or less.

In the invention, the solvent is a solvent composed of water and alumina sol or silica sol solution. If only water is used as solvent as in the prior art, sufficient strength is not obtained, but it is found that a sufficient strength can be obtained by using alumina or silica in colloidal state as solvent.

The content of alumina or silica in the alumina or silica sol solution is preferred to be 10 to 70%, individually. If less than 10%, it is hard to assure sufficient strength, or if more than 70%, it is costly and departs from the practical base. The content of alkali oxide such as $Na_2O_2$ or $K_2O$ in silica sol solution is preferably 0.01% or more to 2% or less. If more than 2%, the strength is lowered.

In addition, as required, an organic binder for regulating the viscosity, or a fiber for preventing sagging or lowering elasticity of coating materials may be properly contained in a range of several percent or less.

As clear from the description herein, the mortar of the invention contains cordierite of low expansibility and silica sol solution as solvent, and by controlling the particle size distribution of cordierite powder as specified, low expansibility and high strength are assured, and an excellent effect is obtained as coating material for protecting or modifying the surface of low-expansion ceramic product. At the same time, the crack extension may be suppressed, so that a monolithic refractory material capable of maintaining an excellent texture state may be obtained.

EXAMPLES

A monolithic refractory material was prepared in the composition as shown in Table 1, by using cordierite powder having a median diameter in a range of 10 to 50 μm, and a sharp mountain-like particle size distribution in which the content of particles smaller than 10 μm is 1% or more to 36% or less, the content of particles ranging from 10 μm or more to 50 μm or less is 50% or more to 75% or less, and the content of particles of 51 μm or more is 1% or more to 14% or less. It was applied on the surface of low-expansion porous ceramic product to protect and modify. In the obtained monolithic refractory material, the strength, processability, and number of cracks were measured, and the results are shown in Table 1. The rupture strength and coefficient of thermal expansion were measured after drying the monolithic refractory material.

In Table 1, the unit of the combination ratio is mass percent. The number of cracks was counted up for the cracks which occurred on the surface (A×B cm) of a ceramic product on which the monolithic refractory material was applied an which could be found visually. In examples 2 to 11, though no water is combined, the remaining component of the silica sol 5% concentration solution is 30 mass percent, for example, 1.5 mass percent is silica and 28.5 mass percent is water.

As a comparative example, a mortar was prepared by using a conventional cordierite powder with median diameter frequency of 5% or less and having a broad mountain-like particle distribution, and the strength, processability, and a number of cracks of the monolithic refractory material were measured, and the results are also shown in Table 1.

As a result, the monolithic refractory material of the invention, as compared with the conventional material, was confirmed to be superior in all characteristics of low expansibility, high strength, and crack extension resistance.

TABLE 1

|  | Comparative example 1 | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Conventional cordierite | 100 | | | | | | | | | | | |
| Improved cordierite | | 100 | 100 | 100 | 100 | 100 | 100 | 100 | 100 | 100 | 100 | 100 |
| Water | 29 | 29 | | | | | | | | | | |
| Silica sol 5% concentration solution | | | 30 | | | | | | | | | |
| Silica sol 10% concentration solution | | | | 32 | | | | | | | | |
| Silica sol 30% concentration solution | | | | | | 35 | | | 35 | 35 | | 35 | 35 |
| Silica sol 50% concentration solution | | | | | | | 37 | | | | | | |

TABLE 1-continued

| | Comparative example 1 | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Silica sol 70% concentration solution | | | | | | | 40 | | | | | |
| Silica sol 80% concentration solution | | | | | | | | | | 42 | | |
| Alkali content | 0 | 0 | 1 | 1 | 1 | 1 | 1 | 1 | 1 | 1 | 1 | 1 |
| Rupture strength MPa | 1.0 | 1.5 | 1.6 | 2.1 | 3.5 | 4.5 | 5.0 | 3.3 | 2.5 | 5.5 | 1.7 | 2.8 |
| Median diameter μm | 25 | 25 | 25 | 25 | 25 | 25 | 25 | 25 | 25 | 25 | 38 | 45 |
| Number of cracks | 150 | 50 | 48 | 30 | 25 | 20 | 15 | 30 | 35 | 10 | 15 | 20 |
| Processibility | ○ | ○ | ○ | ○ | ○ | ○ | ○ | ○ | ○ | ○ | ○ | ○ |

The invention claimed is:

1. A monolithic refractory material having low expansibility, high strength, and crack extension resistance, said monolithic refractory material being prepared by kneading cordierite powder having a median diameter in a range of 10 to 50 μm and a sharp mountain-like particle size distribution in which a content of particles smaller than 10 μm is 1% or more to 36% or less, a content of particles ranging from 10 μm or more to 50 μm or less is 50% or more to 75% or less, and a content of particles of 51 μm or more is 1% or more to 14% or less, and a solvent comprising water and a noncrystalline colloidal solution.

2. The monolithic refractory material having low expansibility, high strength, and crack extension resistance of claim 1, wherein a silica content in the noncrystalline colloidal solution is 10 to 70 mass %.

3. The monolithic refractory material having low expansibility, high strength, and crack extension resistance of claim 1, wherein an alumina content in the noncrystalline colloidal solution is 10 to 70 mass %.

4. The monolithic refractory material having low expansibility, high strength, and crack extension resistance of claim 2, wherein an alkali metal oxide content in the noncrystalline colloidal solution is 0.01 mass % or more to 2 mass % or less.

5. The monolithic refractory material having low expansibility, high strength, and crack extension resistance of claim 3, wherein an alkali metal oxide content in the noncrystalline colloidal solution is 0.01 mass % or more to 2 mass % or less.

* * * * *